United States Patent [19]
Gray et al.

[11] Patent Number: 5,989,003
[45] Date of Patent: Nov. 23, 1999

[54] APPARATUS FOR CONSECUTIVELY MOLDING DIFFERENTLY COLORED PARTS

[75] Inventors: Chris H. Gray; Wade E. Garrett, both of Stephens City; Bruce J. Tallmadge, Winchester; Michael R. Zalipski, Luray, all of Va.; Greg E. Niedzwiecki, Nashville, Ill.

[73] Assignee: Lear Corporation, Southfield, Mich.

[21] Appl. No.: 09/054,633

[22] Filed: Apr. 3, 1998

[51] Int. Cl.⁶ .................................................. B29C 45/16
[52] U.S. Cl. .......................... 425/130; 425/132; 425/145; 425/573; 264/245; 264/297.2; 264/328.18
[58] Field of Search ..................................... 425/130, 573, 425/132, 166, 145; 264/245, 328.18, 73, 297.2, 39

[56] References Cited

U.S. PATENT DOCUMENTS

| | | |
|---|---|---|
| 3,061,879 | 11/1962 | Montpeat . |
| 3,178,497 | 4/1965 | Moscicki . |
| 3,460,203 | 8/1969 | Losserand ................................ 425/130 |
| 3,499,387 | 3/1970 | Zippel ...................................... 417/399 |
| 3,674,398 | 7/1972 | Baumbartner et al. . |
| 3,817,675 | 6/1974 | Maiocco ................................... 425/207 |
| 3,861,841 | 1/1975 | Hanning ................................... 425/146 |
| 4,135,870 | 1/1979 | Wallace et al. ........................... 425/130 |
| 4,315,724 | 2/1982 | Taoka et al. . |
| 4,702,689 | 10/1987 | Schmidt et al. .......................... 425/548 |
| 4,956,133 | 9/1990 | Payne ....................................... 264/40.7 |
| 5,053,176 | 10/1991 | Cameron et al. . |
| 5,223,191 | 6/1993 | Tatsuno et al. .......................... 264/40.1 |
| 5,697,402 | 12/1997 | Hodan et al. ............................. 137/806 |

OTHER PUBLICATIONS

KONA Hot Runner Systems Product Brochure, "DYNISCO KONA HOT RUNNER SYSTEMS, Specialty Hot Runner Systems", Bulletin 465, Sep. 1996, 4 pp.

*Primary Examiner*—Jan H. Silbaugh
*Assistant Examiner*—Stefan Staicovici
*Attorney, Agent, or Firm*—Brooks & Kushman PC

[57] ABSTRACT

Apparatus for molding consecutive streams of differently and homogeneously colored resin in a single mold. The apparatus is used to practice a method including supplying molten resin to a selected one of a plurality of resin passages, injecting colorant selected from a plurality of different colorants into the resin passage, mixing the molten resin and colorant in a mixing element disposed in the resin passage to form a mixture of selectively colored resin, injecting the mixture into the single mold to form a part from the selectively colored resin, and repeating the process by selecting a different resin passage and a different colorant. By this apparatus and method, differently colored parts can be molded without purging the resin passages between the molding, of the parts.

11 Claims, 3 Drawing Sheets

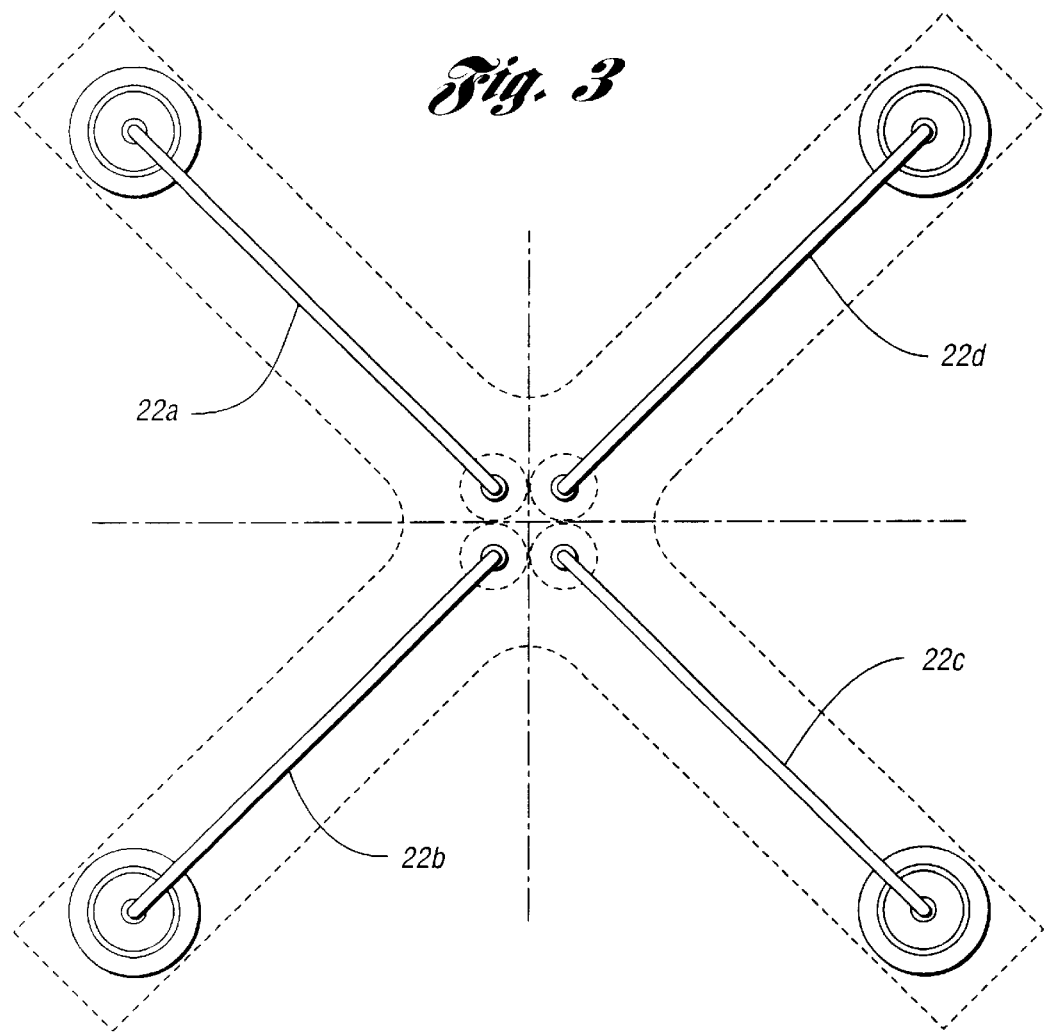
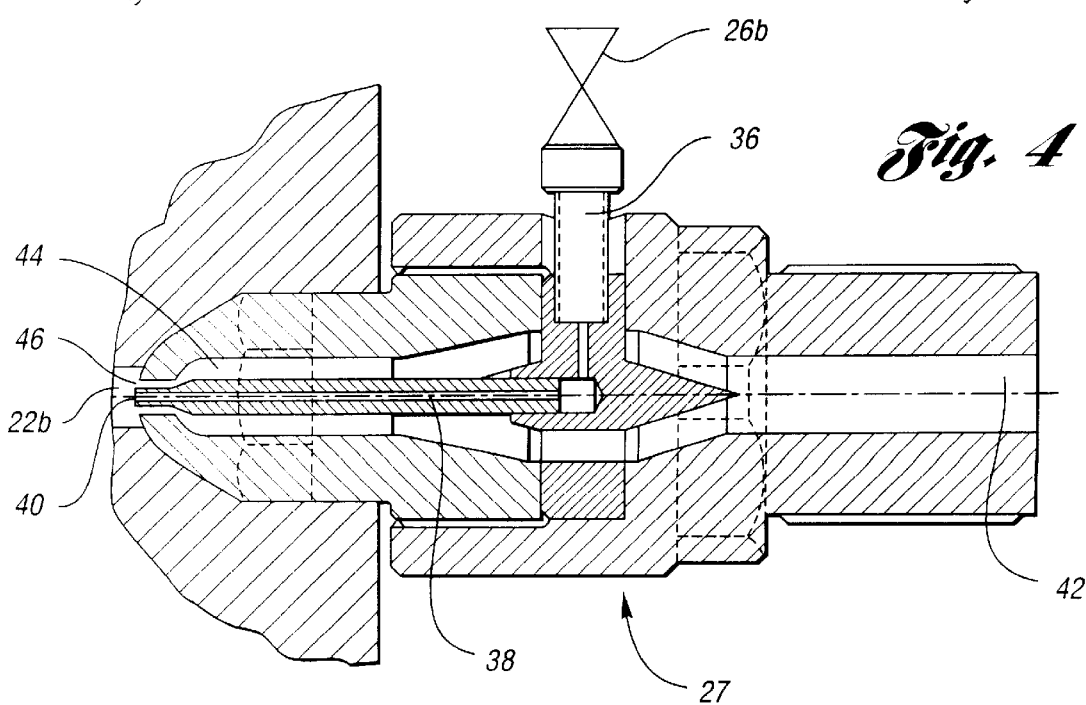

APPARATUS FOR CONSECUTIVELY MOLDING DIFFERENTLY COLORED PARTS

TECHNICAL FIELD

This invention relates to consecutively molding differently colored parts.

BACKGROUND ART

The need to produce differently colored parts consecutively, wherein each part is homogeneously colored, is increasingly important. For example, in-line vehicle sequencing requirements in the motor vehicle industry mandate that parts be supplied to vehicle manufacturers pre-sequenced in the color required for each consecutive vehicle on the assembly line. As a result, parts suppliers must be able to provide differently colored parts on an as needed basis.

A conventional method of making differently colored parts consecutively, wherein each part is homogeneously colored, employs a single injection molding machine which includes a single resin source, multiple colorant sources, a single injection channel and a single mold. After one or more parts are made with a particular colored resin, the injection channel must be purged of that resin so that a differently colored resin can be introduced into the machine. U.S. Pat. No. 3,674,398, for instance, shows a method and apparatus for purging residual material from a mixing chamber and an injection channel of an injection molding machine. This purging cycle requires additional time to perform and results in loss of molding material.

Another method of consecutively making differently and homogeneously colored parts uses multiple molds, each of which is connected to a dedicated injection channel and a dedicated colored resin source. U.S. Pat. No. 3,178,497, for example, shows a method and an apparatus for making single or multi-color, multi-stage injection molded products that incorporate multiple resin sources and multiple molds. Because of the multiple resin sources and multiple molds, this method and apparatus involve significant capital costs.

SUMMARY OF THE INVENTION

The method and apparatus of the present invention enable the molding of a consecutive stream of differently and homogeneously colored parts in a single mold without purging between making the parts and without significant capital costs.

The method for molding a consecutive stream of differently colored parts in a single mold from a resin source and a plurality of different colorants, without purging between making the parts, comprises supplying molten resin to a selected one of a plurality of resin passages, introducing a colorant into the selected resin passage, mixing the molten resin and the colorant in the resin passage to form a mixture of selectively colored resin, injecting the mixture into the single mold to form the part from the selectively colored resin, and repeating the process by selecting a different resin passage and a different colorant. By this method, parts of different colors can be molded in the single mold without purging the resin passages between the molding of differently colored parts.

The injection molding apparatus for making differently colored parts consecutively, from a plurality of different colorant sources and a source of resin, comprises a supply channel adapted to be connected to the source of resin. The supply channel includes a means for melting the resin to form molten resin. A mixing manifold is connected to the supply channel and has at least two resin passages, each of which has an inlet valve, a colorant injection valve adapted to be connected to one of the colorant sources for introducing a colorant into the resin passage, and a mixing element. The apparatus also includes at least two outlet valves, each of which is in communication with one of the resin passages, and a single mold in communication with the outlet valves. An injection control means controls the introduction of molten resin through the inlet valve and the introduction of the colorant through the colorant injection valve selectively into one of the resin passages for mixing in the mixing element to form a mixture of selectively colored resin. The injection control means also controls the injection of the mixture in the resin passage into the mold through the outlet valve in communication with the selected passage.

Accordingly, it is an object of the present invention to provide a method of the type described above in which differently and homogeneously colored parts are molded consecutively in a single mold without purging resin passages between the molding of the differently colored parts.

Another object of the present invention is to provide a method of the type described above in which each differently colored part is molded in a single mold immediately after the preceding part is molded.

Still another object of the present invention is to provide an apparatus of the type described above for molding differently and homogeneously colored parts in a single mold from a single source of plastic resin without purging resin passages between the molding of the differently colored parts.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 3 is a cross-sectional view taken on line 3—3 of FIG. 2 in the direction of the arrows; and FIG. 4 is a fragmentary sectional view of a colorant addition spider, which is provided in an alternative embodiment of the apparatus.

BEST MODES FOR CARRYING OUT THE INVENTION

Figure 1:
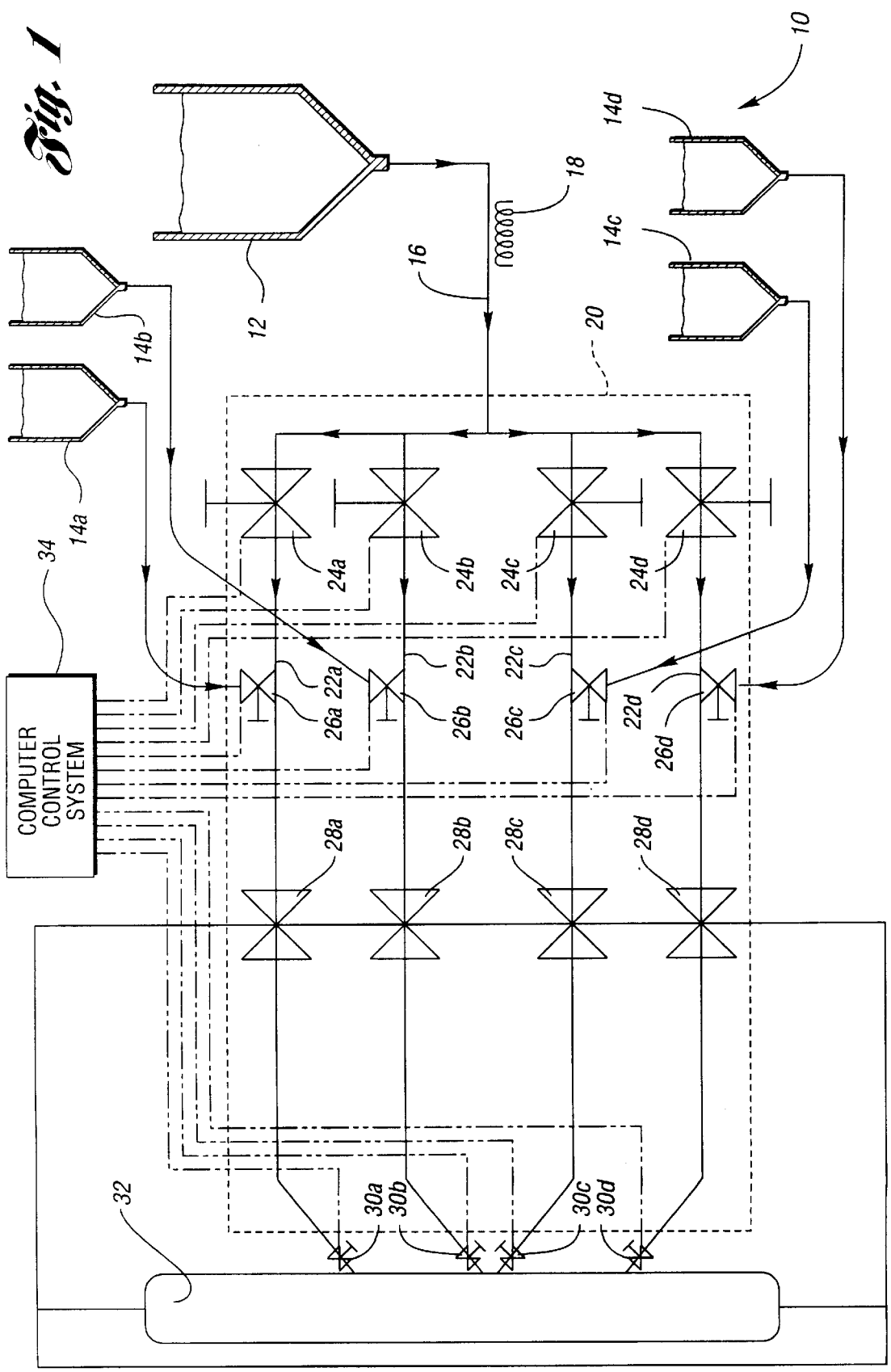
FIG. 1 is a diagrammatical view of an apparatus according to the present invention for consecutively making differently colored parts according to the method of this invention.
Figure 2:
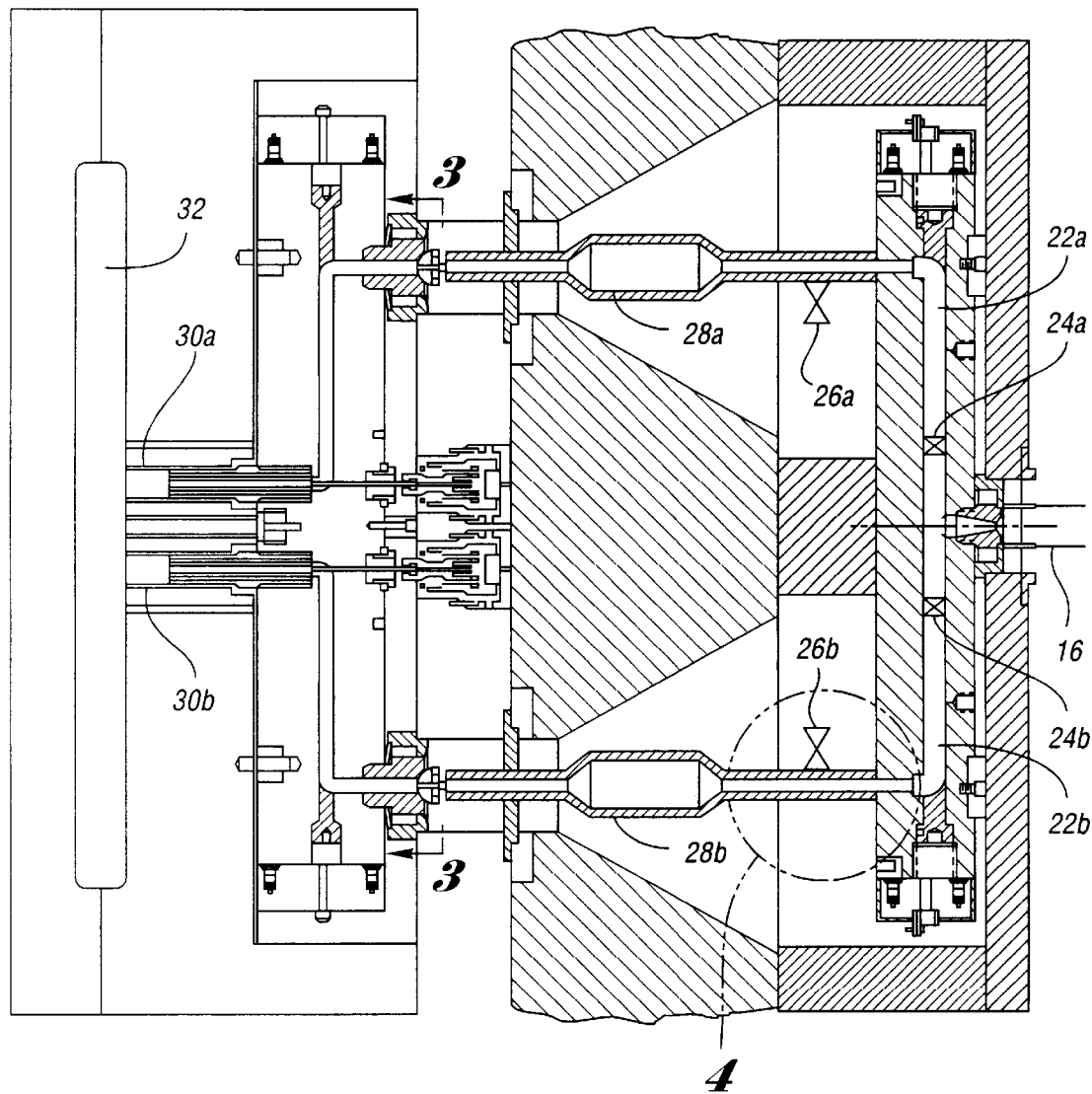
FIG. 2 is a sectional view of a preferred embodiment of the apparatus.

With reference to the drawings, the preferred embodiments of the present invention will be described. FIGS. 1 through 3 show an injection molding apparatus 10 according to the present invention for consecutively making differently colored parts. The apparatus 10 comprises a single source 12 of plastic resin, four colorant sources 14a–d, a supply channel or injection barrel 16, a mixing manifold 20, four outlet valves 30a–d, a single stationary mold 32, and an injection control means 34 such as a computer control system.

The injection barrel 16 is connected to the source 12 of resin and preferably includes a supplemental heating element 18, such as an induction coil, a resistance element, a microwave unit, or any other heating means, for melting the resin in the barrel to form molten resin. The mixing manifold 20 is connected to the barrel 16 and has four resin passages 22a–d as shown in FIG. 1 and FIG. 3. Alternatively, the mixing manifold 20 can be designed with more or fewer resin passages 22a–d depending on molding requirements, and the number of colorant sources 14a–d can be adjusted accordingly.

Each of the resin passages 22a–d has a respective inlet valve 24a–d, a colorant injection valve 26a–d for injecting colorant from the colorant sources 14a–d into the resin passage, and a mixing element 28a–d. One of the outlet valves 30a–d is connected to each resin passage 22a–d, and each outlet valve 30a–d is in communication with the stationary mold 32. Alternatively, the outlet valves 30a–d may be provided as part of the mixing manifold 20. Furthermore, the mixing manifold 20 and the stationary mold 32 may be formed as a unitary assembly.

The computer control system 34 controls the injection of molten resin through one of the inlet valves 24a–d, and the injection of colorant through one of the colorant injection valves 26a–d, into one of the resin passages 22a–d. The computer control system 34 also controls the injection of molten resin mixed with colorant into the stationary mold 32 through one of the outlet valves 30a–d. For example, during the first molding cycle, the computer control system 34 may open injection valve 24a, colorant injection valve 26a and outlet valve 30a, while leaving all other valves closed. As a result, molten resin and colorant are injected through inlet valve 24a and colorant injection valve 26a, respectively, into resin passage 22a. The molten resin and colorant are then mixed by mixing element 28a to form a mixture of selectively colored resin. This mixture is then injected through outlet valve 30a into the stationary mold 32. A part is then conventionally formed in mold 32 from the mixture of selectively colored resin.

If the next part must be a different color, then the computer control system 34 closes all valves in resin passage 22a and may, for example, open injection valve 24c, colorant injection valve 26c and outlet valve 30c. Molten resin is then injected through inlet valve 24c into resin passage 22c and colorant is injected through colorant injection valve 26c into resin passage 22c. Similar to the previous molding cycle, the molten resin and colorant are then mixed by mixing element 28c to form a mixture of a different selectively colored resin. This mixture is then injected through outlet valve 30c into mold cavity 32, where a part of a color different from the preceding part is formed.

Resin passages 22a–d need not be purged of colored resin between the molding of differently colored parts. The method of the present invention thus results in molding parts of different colors in the single mold 32 without down time or extra equipment. Applications of this process include automotive parts and any other differently and homogeneously colored molded parts.

The colorant provided by colorant sources 14a–d may be a liquid colorant or a solid colorant, such as is available from Americhem of Cuyahoga Falls, Ohio. The solid colorant may be a pelletized color concentrate or dry colorant. The solid colorant may be melted by a heating element, such as an induction coil, a resistance element, a microwave unit, or any other heating means, to form molten colorant prior to injecting the colorant through one of the colorant injection valves 26a–d into one of the resin passages 22a–d. If the solid colorant contains a sufficient amount of carrier resin or other suitable material, then the solid colorant may be melted to form molten colorant without requiring any additives. If the solid colorant does not contain a sufficient amount of carrier resin or other suitable material, then the solid colorant may be combined with resin or other suitable material such that the solid colorant may be melted to form molten colorant. In this case, an injection barrel including a heating element may be required upstream of each of the colorant injection valves 26a–d in order to combine and melt the solid colorant with the resin or other suitable material to form molten colorant.

In an alternative embodiment of the invention, each of the resin passages 22a–d is provided with a colorant addition device, such as a spider 27 shown in FIG. 4. The spider 27 facilitates introduction of colorant from one of the colorant sources 14a–d into an associated resin passage 22a–d. Colorant from one of the colorant sources 14a–d is injected through one of the colorant injection valves 26a–d into an injection channel 36 of the colorant addition spider 27. Colorant then passes through an inner channel 38 of the spider 27 and is injected into the associated resin passage 22 through an opening 40 in the inner channel 38. Molten resin enters the spider 27 through a main channel 42 of the spider 27, passes through an outer channel 44 and through an opening 46 in the outer channel 44 into the associated resin passages 22 where it combines with the colorant.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. An injection molding apparatus for making differently colored parts consecutively from a plurality of different colorant sources and a single source of resin, comprising:
   a supply channel adapted to be connected to the source of resin and including means for melting the resin in said supply channel to form molten resin;
   a mixing manifold connected to said supply channel and having at least two resin passages, each of said resin passages having an inlet valve, a colorant injection valve adapted to be connected to one of the colorant sources for introducing a respective colorant into said resin passage, and a mixing element;
   at least two outlet valves, each of said outlet valves being in communication with one of said resin passages;
   a single mold in communication with said outlet valves; and
   an injection control means for controlling the introduction of said molten resin through said inlet valve and the introduction of said colorant through said colorant injection valve selectively into one of said resin passages for mixing in said mixing element to form a mixture of selectively colored resin, and for controlling the injection of said mixture in said selected resin passage into said mold through said outlet valve in communication with said selected passage.

2. The injection molding apparatus of claim 1 wherein said mixing manifold includes said outlet valves.

3. The injection molding apparatus of claim 1 wherein said mixing manifold and said mold are formed as a unitary assembly.

4. The injection molding apparatus of claim 1 wherein said injection control means is a computer system.

5. The injection molding apparatus of claim 1 further comprising means for melting said colorant to form molten colorant.

6. The injection molding apparatus of claim 1, wherein at least one of said resin passages further includes a colorant addition device.

7. An injection molding apparatus for making differently colored parts consecutively in a single mold from a plurality of different colorant sources and a single source of resin, comprising:

a supply channel adapted to be connected to the source of resin and including means for melting the resin in said supply channel to form molten resin;

a mixing manifold connected to said supply channel and having at least two resin passages, each of said resin passages having an inlet valve, a colorant injection valve adapted to be connected to one of the different colorant sources for introducing a respective colorant into said resin passage, and a mixing element;

at least two outlet valves, each of said outlet valves being in communication with one of said resin passages and adapted to supply the single mold; and an injection control means for controlling the introduction of said molten resin through said inlet valves and said colorant through said colorant injection valves selectively into one of said resin passages for mixing in said mixing element to form a mixture of selectively colored resin, and for controlling the injection of said mixture in said selected resin passage into the single mold through said outlet valve in communication with said selected passage.

8. An injection molding apparatus for making differently colored parts consecutively without purging between making parts of a different color, comprising:

a single mold;

a single source of resin;

a plurality of different colorant sources;

a supply channel connected to said source of resin and including means for melting said resin in said supply channel to form molten resin;

a mixing manifold connected to said supply channel and having at least two resin passages, each of said resin passages having an inlet valve, a colorant injection valve connectable to said different colorant sources for introducing a respective colorant into said resin passage, and a mixing element;

at least two outlet valves, each of said outlet valves being connected to one of said resin passages and to said single mold; and an injection control means for controlling the introduction of said molten resin from said single source through said inlet valves and the introduction of said colorant through said colorant injection valves selectively into one of said resin passages for mixing in said mixing element to form a mixture of selectively colored resin, and for controlling the injection of said mixture from said selected resin passage into said single mold through a selected outlet valve connected to said selected passage;

said injection control means being operable substantially immediately thereafter for selectively controlling said inlet valves, said colorant injection valves and said outlet valves to form a second mixture from a different colorant source and inject said second mixture into said single mold without purging between parts.

9. The injection molding apparatus of claim 8, wherein said colorant provided by at least one of said colorant sources is liquid colorant.

10. The injection molding apparatus of claim 8, wherein said colorant provided by at least one of said colorant sources is solid colorant.

11. The injection molding apparatus of claim 10, further comprising means for melting said colorant to form molten colorant.

* * * * *